United States Patent

Narushima

Patent Number: 6,003,972
Date of Patent: Dec. 21, 1999

[54] PRINTER APPARATUS AND PRINTER HEAD

[75] Inventor: Toshio Narushima, Kanagawa, Japan

[73] Assignee: Sony Corporation, Tokyo, Japan

[21] Appl. No.: 08/864,861

[22] Filed: May 29, 1997

[30] Foreign Application Priority Data

Jun. 10, 1996 [JP] Japan ............................. PO8-146866

[51] Int. Cl.$^6$ ...................................................... B41J 2/15
[52] U.S. Cl. ................................................ 347/43; 347/41
[58] Field of Search ........................................ 347/41, 43

[56] References Cited

U.S. PATENT DOCUMENTS 4,540,996  9/1985  Saito .
5,430,469  7/1995  Shioya et al. .

FOREIGN PATENT DOCUMENTS 0 539 157  4/1993  European Pat. Off. .
0 610 096  8/1994  European Pat. Off. .
01208143  8/1989  Japan .

*Primary Examiner*—N. Le
*Assistant Examiner*—Lamson D. Nguyen
*Attorney, Agent, or Firm*—Ronald P. Kananen; Rader, Fishman & Grauer

[57] ABSTRACT

An ink jet printer apparatus includes a print head and a color correction processor. The print head is scanned relatively to a recording medium in a main scan direction and an auxiliary scan direction which is perpendicular to the main scan direction. The print head comprises recording heads of M which are arranged in the main scan direction while displaced from one another at an interval of L dots in the auxiliary scan direction, each of the recording heads having color recording elements of N. When in an interleave operation, every scanning operation, the recording heads of M perform an auxiliary feeding operation at an interval of P dots at (K−1) times and then perform an auxiliary feeding operation at an interval of S dots once, P/K is set as an irreducible fraction, P is set to an integer smaller than N·K/(K−1) and S is set to K·N−P(K−1), and when M>1, for M≦K and L·M≦K, L is set to a positive integer and the recording heads are arranged while displaced from one another at an interval of L dots in the auxiliary scan direction. Alternatively, when M≦K and L·M>K, L is set to a positive integer, and the recording heads are arranged while displaced from one another at the interval of L dots so that L/N is equal to an irreducible fraction. The color correction processor supplies print data to the print head. The color correction processor performs color correction processing suitable for the recording order of the color recording elements on image signals to be recorded.

6 Claims, 16 Drawing Sheets

PRINTER APPARATUS AND PRINTER HEAD

BACKGROUND

1. Field of the Invention

The present invention relates to a printer apparatus and a printer head. More particularly, the present invention relates to a printer apparatus performing a color correction.

2. Background of the Invention

Conventionally, a color recording technique according to an ink jet-type system of a printer apparatus has been practically used as a main technique for a low-price color printer because it can be simply constructed by providing each color ink to the printer apparatus.

In a serial-type printer for scanning a printer head in a main scan direction to perform a print operation, high densification to enhance the resolution of nozzles of the printer head, and increase of speed by lengthening the printer head in the auxiliary scan direction to increase the number of nozzles, are required in order to display a monochromatic or color image at high speed and with high quality.

However, since the high densification of the printer head needs enhanced precision of mechanical elements contained in the printer head, the cost of parts rise and thus the manufacturing cost is increased. Therefore, this is unsuitable to a low-cost printer.

As a countermeasure to the foregoing, there has been proposed a print system for driving the printer head in an interleave operation mode. When the printing operation is performed in the interleave operation mode, a plurality of recording heads which are designed in the same comb-shape and arranged in the main scan direction are arranged so as to be displaced from one another in the auxiliary scan direction. Such a printer head is fed in the auxiliary scan direction to successively record and fill empty portions which have not been recorded.

Japanese Patent Publication No. Hei-03-76226 (JP-B-03 76226) discloses that a printing operation is performed in an interleave mode by using a printer head in which plural color recording heads each having nozzles of N are stepwise arranged so as to be displaced from one another in an auxiliary scan direction at an interval of L dots whose number is equal to an integer times N. According to this printer apparatus, after a sufficient time lapse to dry color ink which is preferentially jetted from the nozzles, different color ink is then overlaid on the former color ink to avoid reduction in image quality due to mutual ooze between the respective color inks.

Further, there is a method of performing a recording operation while carrying out one dot-line auxiliary feeding operation in the auxiliary scan direction as another interleave operation, and then performing the auxiliary feeding operation of a next recording portion at the stage that the dots corresponding to the head width are filled. For example, for N=15 and K=4, the main scanning operation is performed at four times by 1-dot line feeding, and the last main scanning operation is performed by 47-dot line feeding. In such an interleave operation, the interval of the last recording dots is determined by the pitch of the auxiliary scan feeding operation, and the recording operation in which the interval is narrowed in accordance with the nozzle interval of the head can be performed, and thus this is effective to high densification.

Further, Japanese Laid-open Patent Application No. Hei-06-127032 (JP-A-06 127032) discloses a method of setting the auxiliary scan feed amount to two types of P dots and S dots to perform an interleave operation, whereby the problems which occur due to the construction as described above can be solved.

However, the above-described printer apparatuses have the following problems, and a further improvement has been required. In the case of the printer apparatus disclosed in Japanese Patent Publication No. Hei-03-76226 (JP-B-03 76226), the displacement amount between the respective heads must be set to positive integer times of the nozzle number (N). Therefore, in a recent printer head having many nozzles, the overall displacement amount of four color heads in the auxiliary scan direction is greatly increased, and thus there is a problem that a carriage on which the printer head is mounted is larger.

Further, an ineffective recording area in the auxiliary scan direction is extended to a broad range, and thus a print time is long.

Still further, in the case of the method of performing the auxiliary feeding operation of a next recording portion at the stage that the dots corresponding to the head width are filled, the print is performed by the same nozzle over plural scan lines, and thus there is a problem that dispersion in the jet characteristic of respective nozzles is conspicuous.

Still further, in the case of the method disclosed in Japanese Laid-open Patent Application No. Hei-06-127032 (JP-A-06 127032), the print order for a pixel is varied every scanning line, so that the color reproduction characteristic may be varied every scan line. The color reproduction characteristic is varied in accordance with the characteristic of ink (for example, dye or pigment), the characteristic of the surface of recording sheet (for example, sheet quality such as exclusively used sheets, plain sheets, recycle sheets, OHP sheets, etc.), and the mutual relation therebetween (for example, ink is liable to ooze into recording sheet).

SUMMARY OF THE INVENTION

It is, therefore, an object of the present invention to provide a printer apparatus which resolves the above-mentioned problem.

It is another object of the present invention to provide a print head apparatus which resolves the above-mentioned problem.

According to the present invention, there is provided a printer apparatus including a print head and a color correction processor. The print head is scanned relatively to a recording medium in a main scan direction and an auxiliary scan direction which is perpendicular to the main scan direction. The print head comprises recording heads of M which are arranged in the main scan direction while displaced from one another at an interval of L dots in the auxiliary scan direction, each of the recording heads having color recording elements of N. When in an interleave operation, every scanning operation, the recording heads of M perform an auxiliary feeding operation at an interval of P dots at (K−1) times and then perform an auxiliary feeding operation at an interval of S dots once, P/K is set as an irreducible fraction, P is set to an integer smaller than N·K/(K−1) and S is set to K·N−P(K−1), and when M>1, for M≦K and L·M≦K, L is set to a positive integer and the recording heads are arranged while displaced from one another at an interval of L dots in the auxiliary scan direction. The color correction processor supplies print data to the print head. The color correction processor performs color correction processing suitable for the recording order of the color recording elements on image signals to be recorded.

According to the present invention, there is provided a printer apparatus including a print head and a color correction processor. The printer is scanned relatively to a recording medium in a main scan direction and an auxiliary scan direction which is perpendicular to the main scan direction. The print head comprises recording heads of M which are arranged in the main scan direction while displaced from one another at an interval of L dots in the auxiliary scan direction, each of the recording heads having color recording elements of N. When in an interleave operation, every scanning operation, the recording heads of M perform an auxiliary feeding operation at an interval of P dots at (K−1) times and then perform an auxiliary feeding operation at an interval of S dots once, P/K is set as an irreducible fraction, P is set to an integer smaller than N·K/(K−1) and S is set to K·N−P(K−1), and when M≦K and L·M>K, L is set to a positive integer and the recording heads are arranged while displaced from one another at an interval of L dots so that L/N is equal to an irreducible fraction. The color correction processor supplies print data to the print head. The color correction processor performs color correction processing suitable for the recording order of the color recording elements on image signals to be recorded.

According to the present invention, there is provided a print head apparatus. The print head apparatus is scanned relatively to a recording medium in a main scan direction and an auxiliary scan direction which is perpendicular to the main scan direction. The print head apparatus includes plural recording heads having color recording elements of N. The recording heads of M are arranged in the main scan direction while displaced from one another at an interval of L dots in the auxiliary scan direction. When in an interleave operation, every scanning operation, the recording heads of M perform an auxiliary feeding operation at an interval of P dots at (K−1) times and then perform an auxiliary feeding operation at an interval of S dots once, P/K is set as an irreducible fraction, P is set to an integer smaller than N·K/(K−1) and S is set to K·N−P(K−1), and when M>1, for M≦K and L·M≦K, L is set to a positive integer and the recording heads are arranged while displaced from one another at an interval of L dots in the auxiliary scan direction.

According to the present invention, there is provided a print head apparatus. The print head apparatus is scanned relatively to a recording medium in a main scan direction and an auxiliary scan direction which is perpendicular to the main scan direction. The print head apparatus includes plural recording heads having color recording elements of N. The recording heads of M are arranged in the main scan direction while displaced from one another at an interval of L dots in the auxiliary scan direction. When in an interleave operation, every scanning operation, the recording heads of M perform an auxiliary feeding operation at an interval of P dots at (K−1) times and then perform an auxiliary feeding operation at an interval of S dots once, P/K is set as an irreducible fraction, P is set to an integer smaller than N·K/(K−1) and S is set to K·N−P(K−1), and when M≦K and L·M>K, L is set to a positive integer and the recording heads are arranged while being displaced from one another at an interval of L dots so that L/N is equal to an irreducible fraction.

BRIEF DESCRIPTION OF THE DRAWINGS

The invention will be more readily understood with reference to the accompanying drawing, wherein.

DESCRIPTION OF THE INVENTION

A printer apparatus according to the present invention will be described with reference to the accompanying drawings. In the following description, the present invention will be described by taking a two-liquid mixture type ink jet printer (hereinafter referred to as "carrier jet printer") as a printer apparatus according to an embodiment of the present invention.

Figure 1:
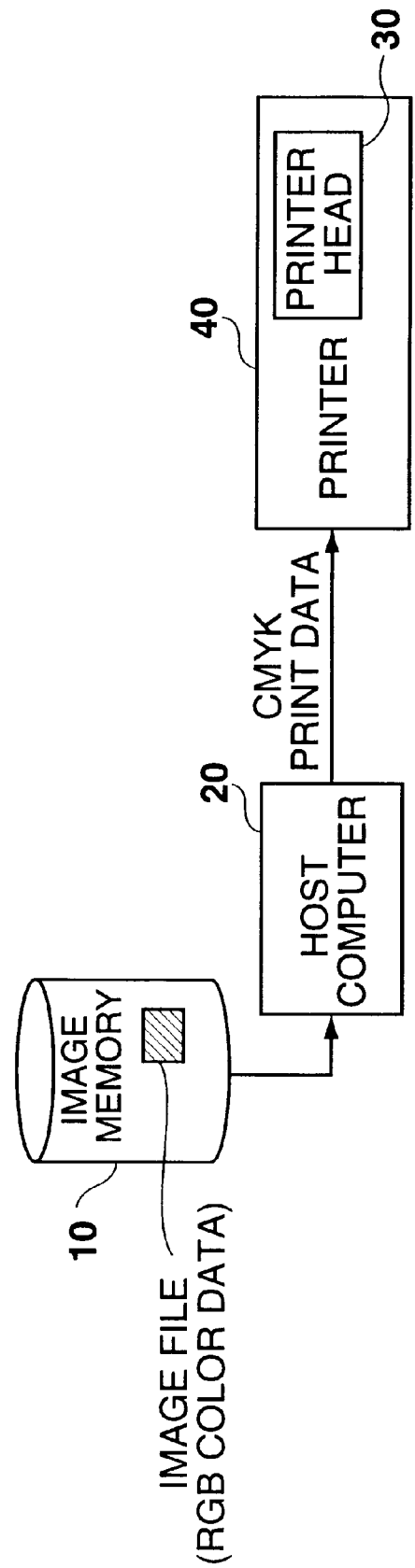
FIG. 1 is a block diagram showing the whole construction of a printer system according to the present invention.

First, the overall construction of the printer system will be described. FIG. 1 is a block diagram showing the overall construction of a printer system. The printer system includes an image memory 10 in which plural image files are stored, a host computer 20 for converting color data of R (red), G(green) and B(blue) to print data of C(cyan), M(magenta), Y(yellow), K(black), and a carrier jet printer 40 for recording print data of C,M,Y,K by using a printer head 30. A parallel interface (I/F) such as IEEE Std 1284 (called "by Centronics"), SCSI-2 or the like, or a serial I/F such as RS-232C or RS-422 may be used as an interface (I/F) for connecting the host computer 20 and the carrier jet printer 40. In this embodiment, the parallel interface (I/F) is used because the number of transmission data is large.

The host computer 20 includes a CPU, a flash memory, a RAM, etc. which are well known. It reads out an image file from the image memory 10 to perform various kinds of processing as described later, and then outputs to the carrier jet printer 40 print data which are required for one scanning operation of the printer head 30. The carrier jet printer 40 prints on a recording sheet print data of one scanning operation which are received from the host computer 20. The image memory is composed of a hard disk or a CD-ROM disc. The construction of the carrier jet printer 40 will be described later in detail.

Figure 2:
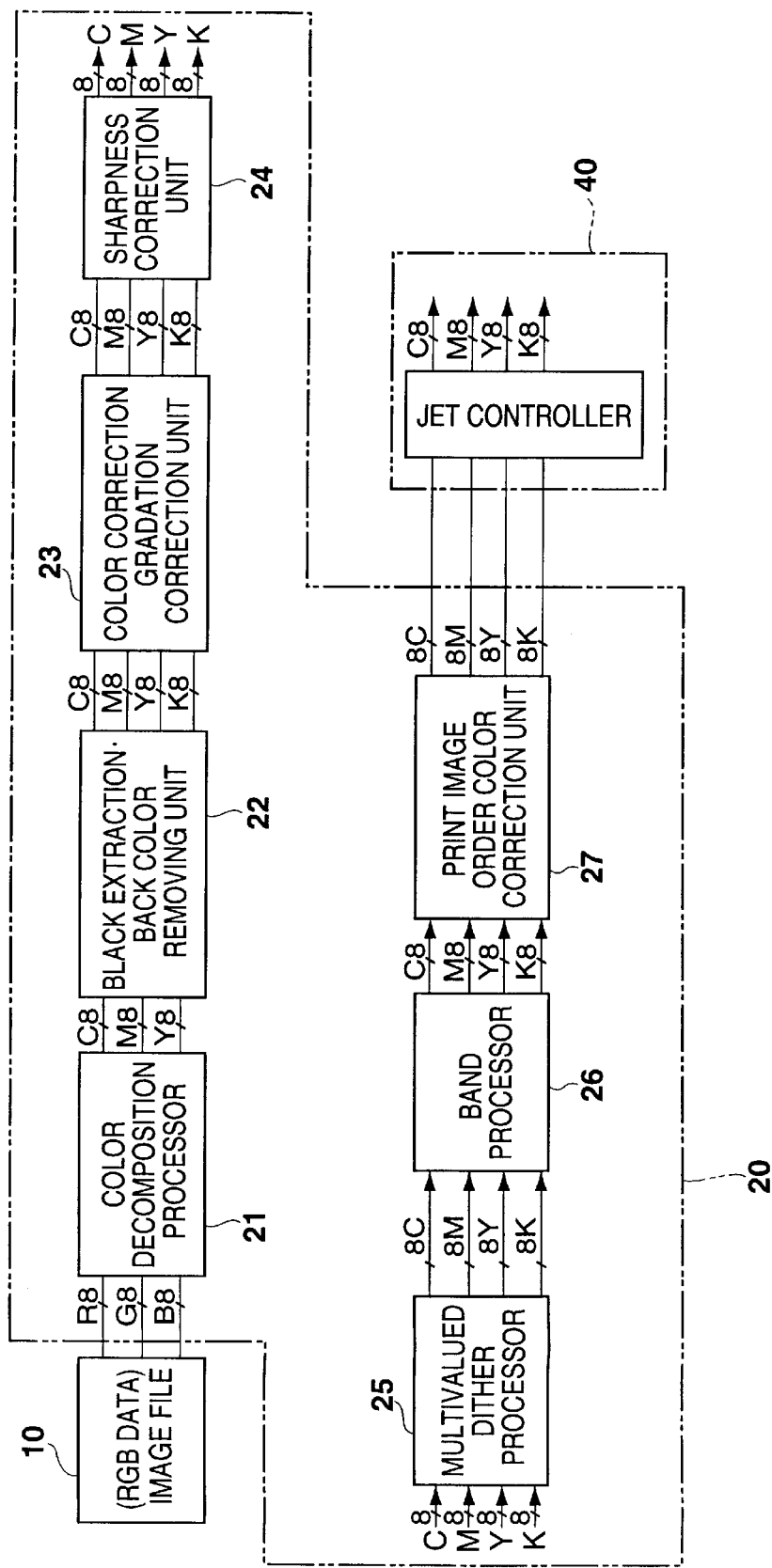
FIG. 2 is a block diagram showing signal processing which is performed by a host computer.

FIG. 2 is a block diagram showing signal processing which is executed by the host computer 20. The host computer 20 is provided with a color decomposition processor 21, a black extraction back color removing unit 22, a color correction gradation correction unit 23, a sharpness correction unit 24, a multivalued dither processor 25, a band processor 26 and a print order color correction unit 27, and the host computer 20 performs various processing as described later.

In the host computer 20, when reading out an image file from the image memory 10, the color decomposition processor 21 performs processing of converting the R, G and B data of the image file into C, M and Y data. Each data of R, G and B is 8 bit data. When a recording bead of K (black) is prepared for the printer head 30, the black extraction and back color removing unit 22 extracts the black (K) component from the C, M and Y data, and newly generates C, M, Y and K data. The color correction and gradation correction unit 23 performs color correction and gradation correction when correction is required in accordance with the print characteristic of the printer. The sharpness correction unit 24 performs processing of sharpening images (high band emphasis, MTF correction, blur correction), processing of removing noises (smoothing, background removing), etc.

The multivalued dither processor 25 reproduces through multi-gradation dither processing (a multi-gradation error diffusion method, for example) the gradation which cannot be reproduced by the maximum dot gradation number of the carrier jet printer 40. In order to perform a head scan operation of the carrier jet printer 40 and an interleave auxiliary feeding operation, every scanning line, the band processor 26 rearranges the C, M, Y and K data in the order which is actually used in the head scanning operation.

When the ink jetting order (print order) of each color for an image on a recording sheet is varied every scanning line and the difference in image quality thereof is visually recognized, the print order correction unit 27 performs the color correction processing in response to an instruction. The print order color correction unit 27 has the color correction processing which is optimum to the print order of each color ink, and selects a suitable color correction method every scanning line to perform the color correction processing because the print order of each scanning line is known in accordance with the position of a print area. Here, the color correction processing optimum to the print order is assumed to be experimentally determined in advance.

The host computer 20 performs the color correction processing to generate print data, and transmits the print data in synchronism with the actual print operation of the carrier jet printer 40.

Since the print order color correction unit 27 can perform the processing when the print order of each color ink is known, the processing can be performed together with the processing of the color decomposition processor 21 and the black extraction and back color removing unit 22. By performing the processing of the color decomposition processor 21 and the processing of the back color removal processing 22 in combination, the number of processing steps can be reduced, and the processing time of the host computer 20 can be shortened, so that deterioration of data precision due to repetitive calculation is avoidable.

Next, the ink jetting order of each color ink (print order), that is, the overlay order of each color ink on the recording sheet, and the color correction processing suitable for the order will be described. In the following description, in order to simplify the description, there will be described a case where the color correction processing is performed on three colors of C, M and Y data.

In general, when a color image having a halftone is recorded by ink dots, respective color ink of cyan (C), magenta (M) and yellow (Y) which are complementary to the three primary colors of red (R), green (G) and blue (B) respectively is used, and a halftone is expressed by a subtractive color mixing method of overlaying dots of the complementary color ink dots. In the spectral characteristics of each complementary color ink, the density does not clearly vary, but moderately varies in a range from zero value until 100% value at a boundary between respective complementary bands, and thus any pure complementary color is not obtained. Accordingly, when dots of complementary color ink dots are coated while overlaid on each other, ink dots which are directly coated on the recording sheet are well absorbed, and thus do not expand. Conversely, ink dots which are coated on the former ink dots are not well absorbed, and thus they expand. Accordingly, when a coating order is varied, the relationship in size between the respective complementary color ink dots to be subjected to the subtractive color mixing is inverted. Therefore, the color mixing state is varied due to the expansion of the spectral characteristics of the respective complementary color ink as described above, and also the absorption and reflection state of ink dots to incident light is inverted, so that the color mixing state is further varied due to the variation of the coating order of the ink dots. Accordingly, the color correction is performed by the following method in order to prevent variation of the halftone and deterioration in image quality of a recorded color image. For example, a print order color correction processor 27 for performing the color correction processing is composed of a CPU 28 and plural RAMs 29 in a host computer 20.

Figure 3:
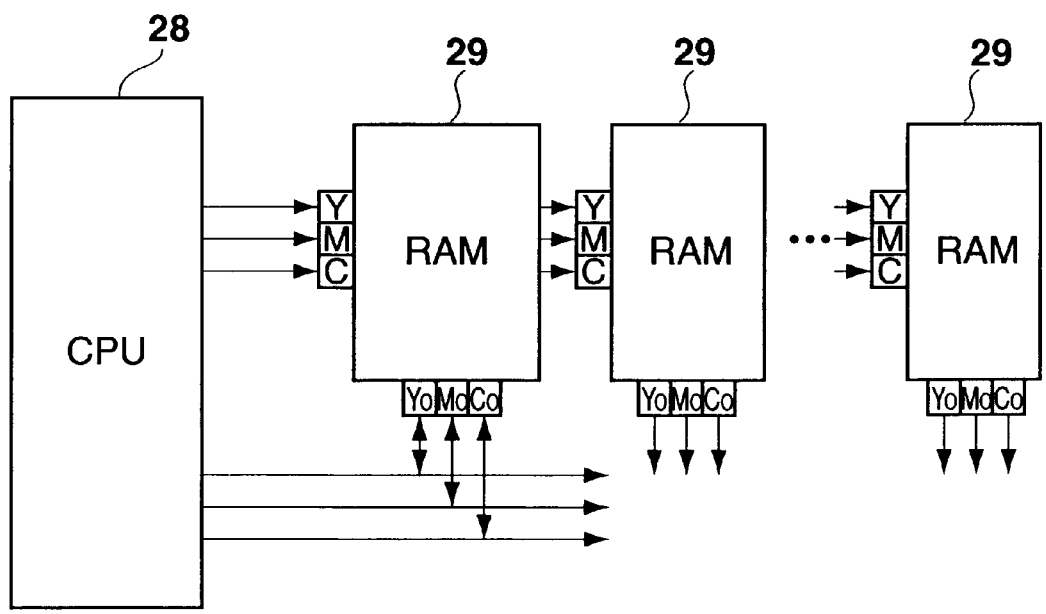
FIG. 3 is a block diagram showing the construction of a color correction processor.

First, masking coefficients are previously stored in the RAM 29 of the host computer 20 in order to correct the deviation of the halftone in the subtractive color mixing process based on the deviation of the optical characteristic of ink which is a complementary color member. FIG. 3 is a block diagram showing the construction of the color correction processing unit. The CPU 28 in the host computer 20 extracts Co, Mo and Yo data from the RAM 20 which is masked with the C, M and Y data of each scanning line as addresses.

The complementary color correlating masking coefficients between the three complementary color signals C, M and Y obtained by subjecting complementary color conversion to image signals of the primary colors of R, G and B. and the three corrected complementary signals Co, Mo and Yo obtained by correcting the deviation of the spectral characteristics of the complementary color ink, are represented by cy, cm, my, mc, ym and yc, and set as shown in [equation 1].

$$\begin{pmatrix} Yo \\ Mo \\ Co \end{pmatrix} = \begin{pmatrix} 1 & y_m & y_c \\ m_y & 1 & m_c \\ c_y & c_m & 1 \end{pmatrix} \begin{pmatrix} Y \\ M \\ C \end{pmatrix} \qquad \text{[Equation 1]}$$

That is, $Yo = Y + ym \cdot M + yc \cdot C$ $Mo = my \cdot Y + M + mc \cdot C$ $Co = cy \cdot Y + cm \cdot M + C$ Specifically, a conversion parameter of a print order is provided at an actual print time, the print order is determined on the basis of a print line number at the print time, and the color correction processing of each scan line is performed on the basis of the print order.

The respective parameter values and the corresponding relationship thereof are determined beforehand. The parameter value is varied in accordance with the variation of the characteristic of each color ink, and thus it is changeable every time the characteristic of the ink is varied, for example, when an user uses different ink.

Figure 4:
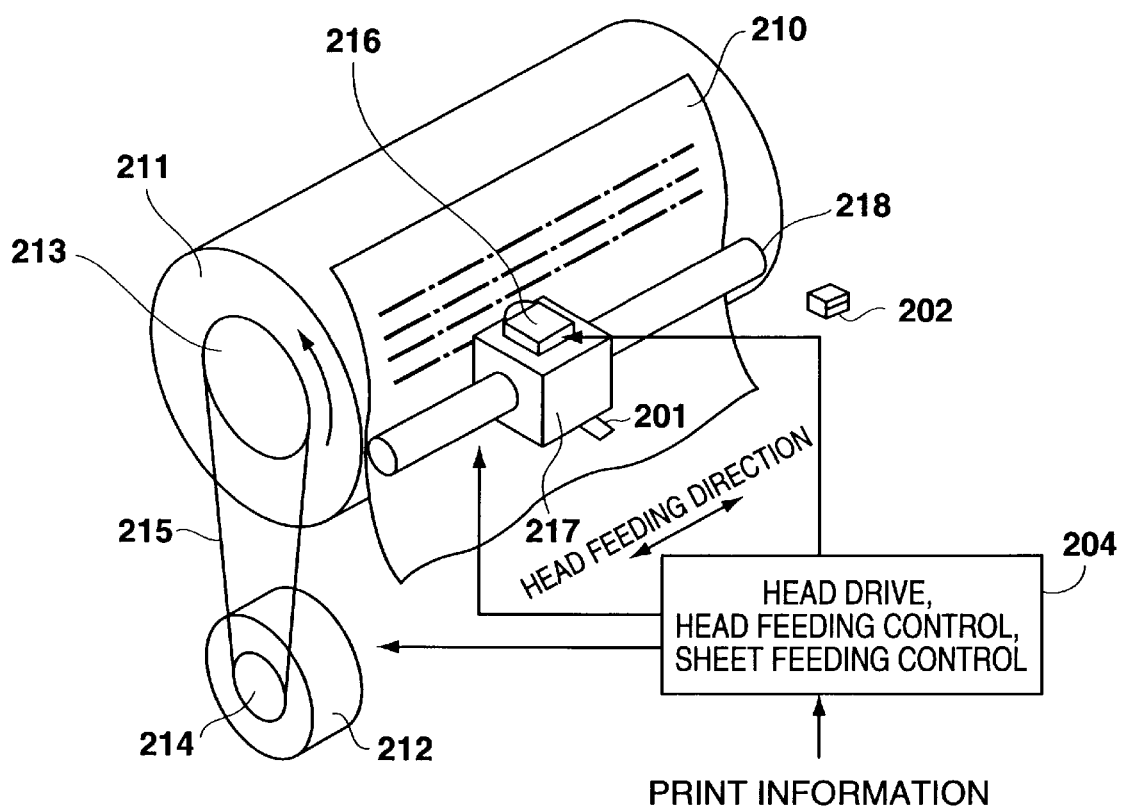
FIG. 4 is a perspective view showing a printer head mechanism of the carrier jet printer.

Next, the construction of the carrier jet printer 40 will be described. FIG. 4 is a perspective view showing a printer head mechanism of a carrier jet printer. A recording sheet 210 is fed while wound around a platen 211, and the platen 211 is rotationally driven through pulleys 213 and 214 and a belt 215 by a sheet feeding motor 212.

The printer head 30 is fixed through a head feeding mechanism 217 to a feeding screw 218 which is provided parallel to the peripheral surface of the platen 211, and it is moved parallel to the peripheral surface of the platen 211 by the head feeding mechanism 217. The head feeding mechanism 217 is provided with a tab 201, and the tab 201 is detected by a position detection sensor 202 which is provided in a movement passage of the head feeding mechanism 217 to detect the scanning position of the printer head 30.

When print information is supplied from the host computer 20 to the driving controller 204, control signals for head drive, head feeding control, sheet feeding control, etc. are formed in the driving controller 204. These control signals thus generated are supplied to each of the recording head 216, the head feeding mechanism 217 and the sheet feeding motor 212, and the print operation, the feeding operation of the recording sheet 210 and the scanning operation of the printer head 30 are performed in accordance with the print information.

Figure 5:
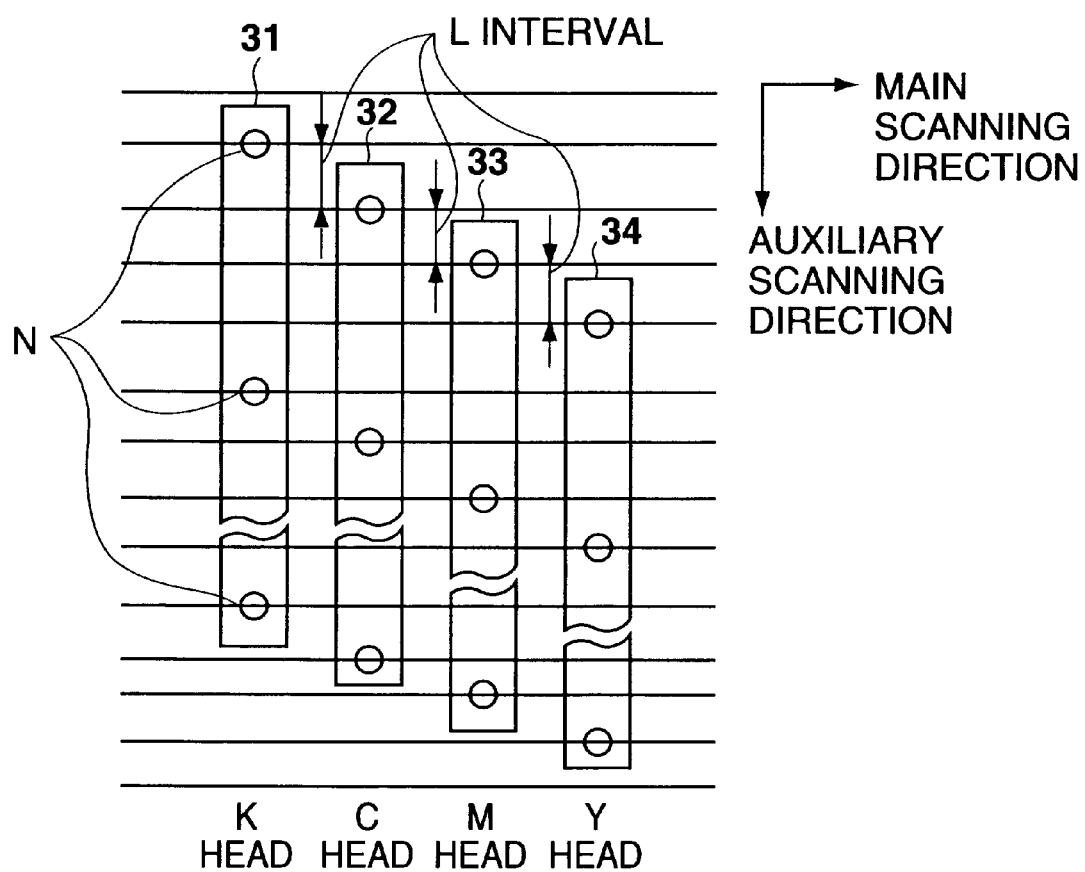
FIG. 5 is a diagram showing the arrangement of recording heads which are provided to the printer head.

The printer head according to this embodiment has a single recording head or plural recording heads. FIG. 5 is a diagram showing the arrangement of the recording heads which are provided to the printer head. There will be described a case where the printer head 30 has four color recording heads 31 to 34 of black (K), cyan (C), magenta (M) and yellow (Y). Nozzles of N are arranged at an interval of K dots (K resolution element interval) in the Y (auxiliary scanning) direction on each of the four color recording heads 31 to 34 so that the displacement between the respective recording heads is equal to an interval of L dots.

Figure 6A:
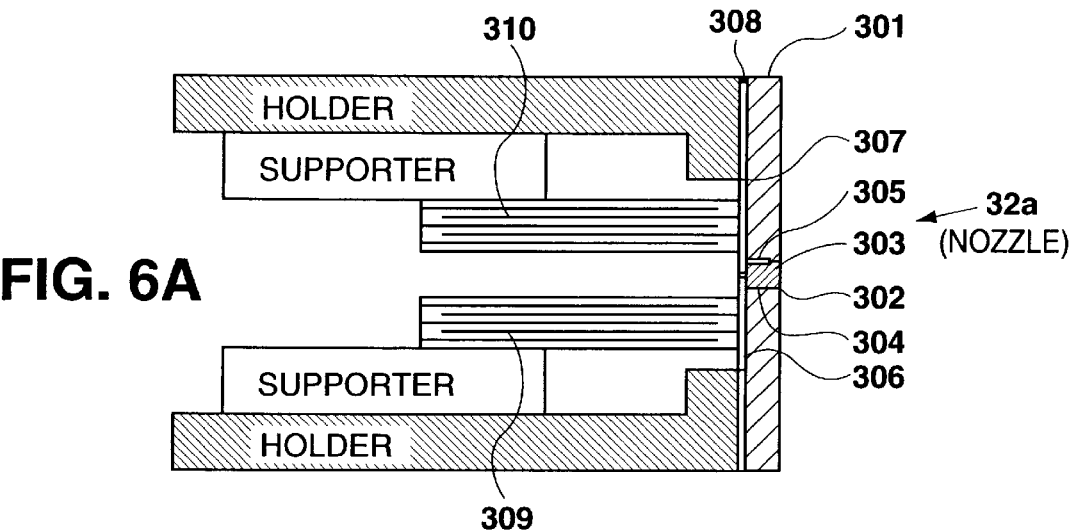
FIGS. 6A and 6B are cross-sectional views showing an ink jetting mechanism of the printer head.
Figure 6B:
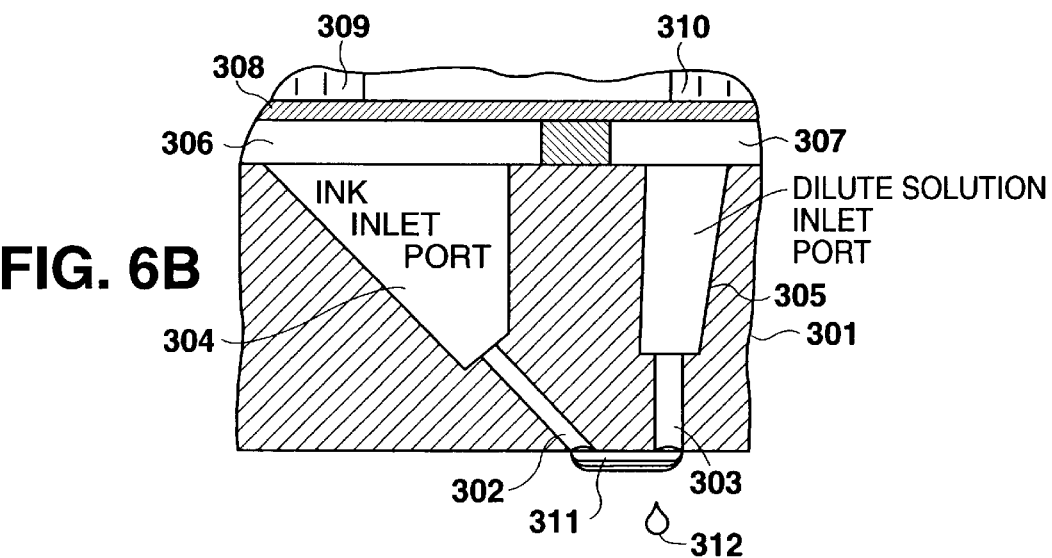

For an interleave operation where the feeding operation in the auxiliary scan direction at an interval of P dots is performed (K−1) times fog every main scanning and then the feeding operation in the auxiliary scan direction at an interval of S dots is performed once in the printer head 30, the printer head 30 is set to satisfy the following conditions in this embodiment. That is, for the ratio K and P, P/K is equal to an irreducible fraction. P which satisfies P<N·K/(K−1) is a positive integer. S=K·N−P·(K−1). Representing the number of the recording heads by M, when M>1, for M≦K and L·M≦K, the respective recording heads are displaced from one another L by L (L is a positive integer). Alternatively, for M≦K and L·M>K, the recording heads are displaced from one another L by L so that L/K is equal to an irreducible fraction (L represents a positive integer). FIGS. 6A and 6B are cross-sectional views showing an ink jetting mechanism of the printer head. The printer head 30 performs a halftone print operation by using mixed liquid obtained by mixing ink whose amount is quantified in accordance with print information and a prescribed amount of dilute solution.

FIG. 6A shows the construction of the overall ink jetting mechanism, and FIG. 6B shows the structure of a main part. An orifice plate 301 is provided with a quantification side nozzle 302 and a jet side nozzle 303. An ink introducing port 304 and a dilute solution introducing port 305 are linked to the rear portions of the nozzles 302 and 303, respectively.

These introducing ports 304 and 305 intercommunicate with a quantification side cavity 306 and a jet side cavity 307 respectively, and a diaphragm 308 is provided on the back surface of the cavities 306 and 307. The diaphragm 308 is driven by a quantification side electrostrictive element 309 and a jet side electrostrictive element 310.

Figure 7A:
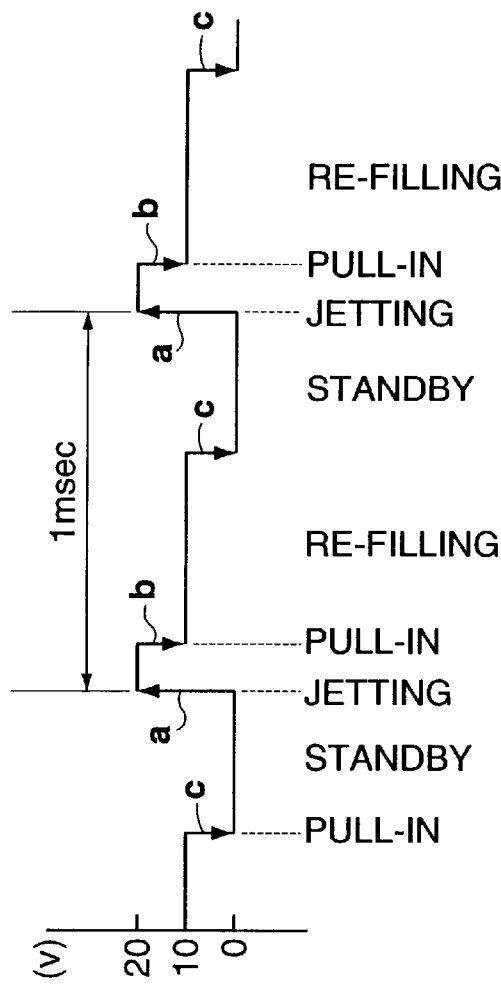
FIGS. 7A and 7B are timing charts showing a driving signal to be supplied to a quantification side electrostrictive element and a jet side electrostrictive element.
Figure 7B:
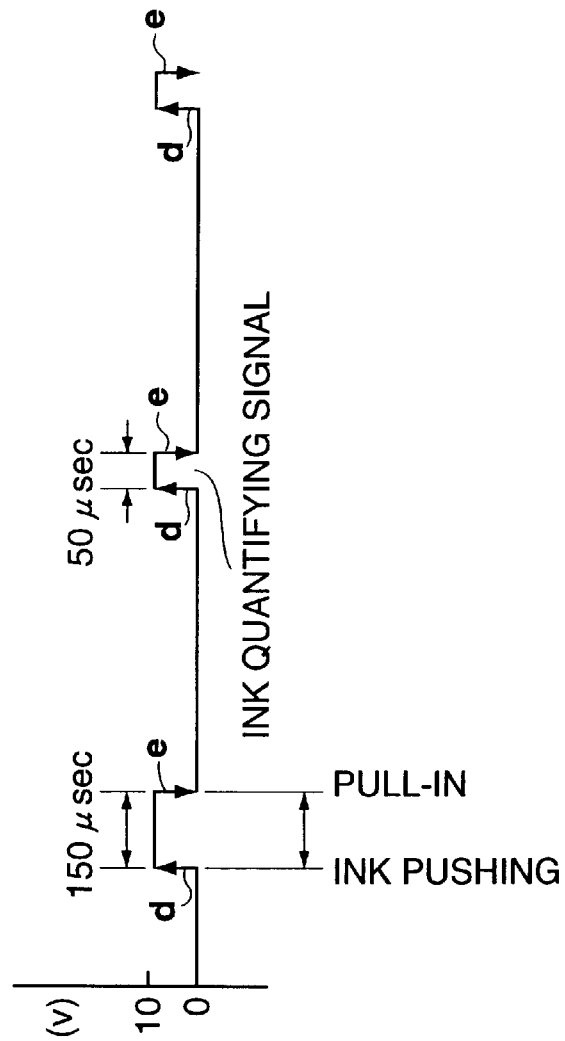

FIGS. 7A and 7B are timing charts showing a driving signal which is supplied to the quantification side electrostrictive element 309 and the jet side electrostrictive element 310. FIG. 7A shows a driving signal to be supplied to the jet side electrostrictive element 310. Dilute solution filled in the dilute solution introducing port 305 is jetted from the jet side nozzle 303 by applying a great displacement to the electrostrictive element 310 at a timing a. At a timing b and a timing c, the jet side electrostrictive element 310 is pulled in, and the dilute solution is filled from the jet side cavity 307 into the dilute solution introducing port 305 again.

FIG. 7B shows a driving signal which is supplied to the quantification side electrostrictive element 309. At a period of d–e, ink us pushed out from the quantification side nozzle 302, and the pushed ink 311 is trapped at the front face side of the jet side nozzle 303. When the dilute solution is jetted from the jet side nozzle 303, a droplet 312 of the dilute solution is mixed with the ink whose amount corresponds to the thickness of the trapped ink 311.

The jet timing a in FIG. 7A is set at an interval of 1 msec., and at this time a voltage of 0 to 20 (V) is applied to the jet side electrostrictive element 310. The mechanical displacement of the jet side electrostrictive element 310 due to the given voltage causes the dilute solution to be jetted. On the other time, at a timing d in FIG. 7A, a voltage of 0 to 10 (V) for example is applied to the quantification side electrostrictive element 309. However, the displacement of the electrostrictive element 309 due to this voltage does not cause jetting of the ink, and it merely causes ink to be pushed out from the tip of the nozzle 302.

The thickness of the ink which is pushed out to the front face of the jet side nozzle 303 and trapped can be controlled by the length of the period d–e and the voltage value in FIG. 7B, and the ink density of the jetted droplet 312 can be freely controlled. That is, the printing operation can be performed with any halftone by controlling the length of the period d–e and the voltage value, for example like 10 (V) for 150 microseconds, 10 (V) for 50 microseconds, in accordance with the print information. The width or amplitude of the period d to e may be freely varied.

Figure 8:
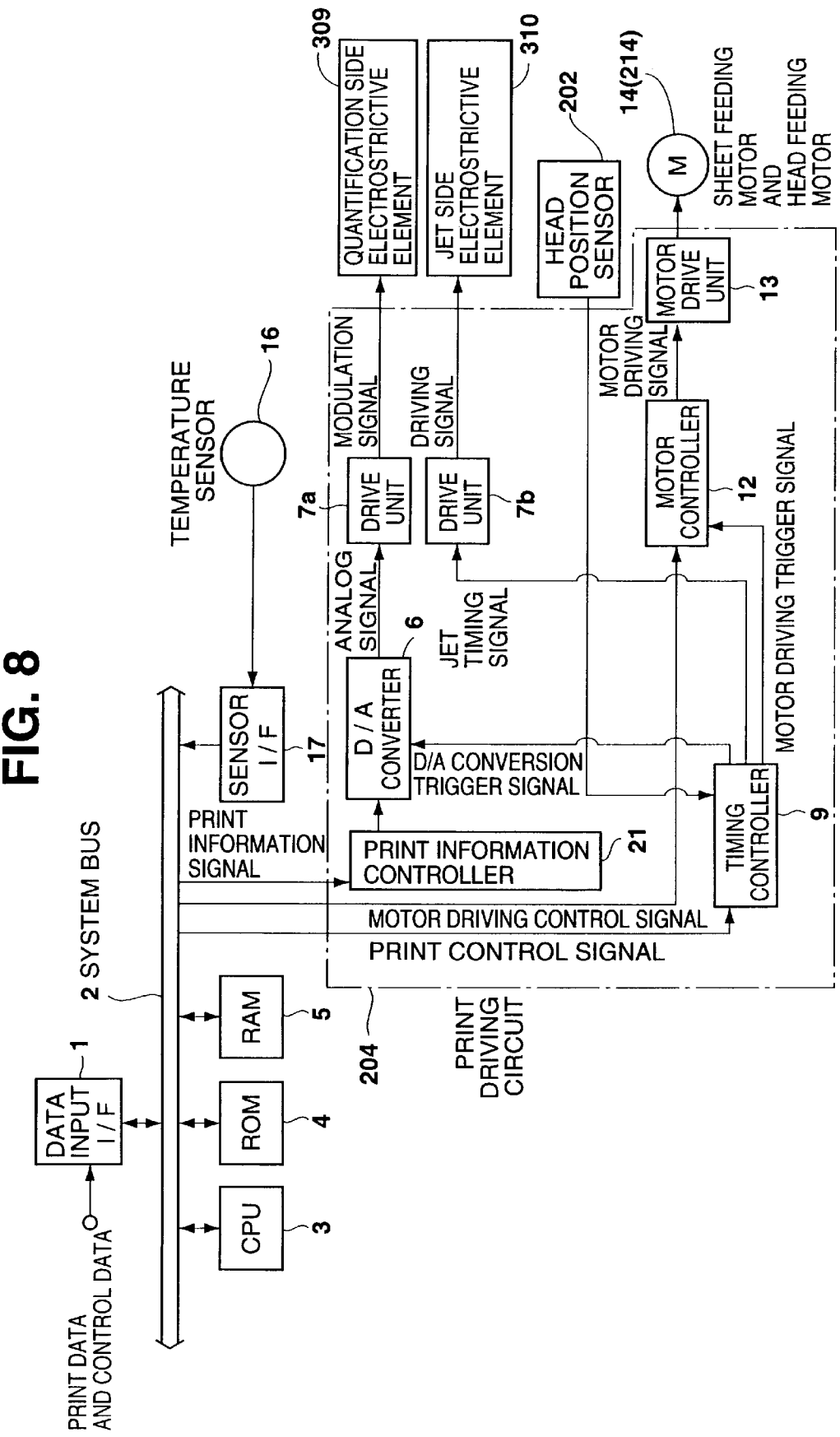
FIG. 8 is a block diagram showing the construction of a control system of the carrier jet printer of the embodiment of the present invention.

Next, the construction of a control system of the carrier jet printer having a printer head 30 will be explained. FIG. 8 is a block diagram showing the construction of the control system of the carrier jet printer. The carrier jet printer 40 has a data input interface (I/F) 1 connected to a system bus 2, a CPU 3, a ROM 4, a RAM 5, a sensor I/F 17 and a driving controller 204.

The data input I/F supplies the print data and the control data from the host computer 20 to the system bus 20. As the data input I/F may be used a parallel interface such as Centronics, SCSI or the like, or a serial interface such as RS-232C, RS-422 or the like.

The driving controller 204 is provided with a D/A converter 6, a timing controller 9, a motor controller 12, a motor drive unit 13, drive units 7 and 10. The quantification side electrostrictive element 309 is connected to the drive unit 7, and the jet side electrostrictive element 310 is connected to the drive unit 10.

The head position sensor 202 is connected to the timing controller 9, and the sheet feeding motor 214 and the head feeding motor 14 are connected to the motor drive unit 13. A temperature sensor 16 which is provided in the vicinity of the nozzles 32a of the printer head 30 is connected to the sensor I/F 17.

In the carrier jet printer thus constructed, the CPU 3 controls both the mixing and jetting operations of each nozzle 32 of the carrier jet printer on a line basis when it drives each nozzle 32a of the printer head 30 every scan in accordance with the print processing as described later.

The CPU 3 inputs a print information signal transmitted through the data input I/F 1 from the host computer 20 into the D/A converter 6 through the system bus 2. The D/A converter 6 converts the print information signal to an analog signal, and then outputs it to the drive unit 7. The drive unit 7 outputs a modulation signal, and drives the quantification side electrostrictive element 309 of the printer head 30 to adjust the quantity of ink 311 in accordance with the print information.

The timing controller 9 outputs a motor driving trigger signal to the motor controller 12. Upon receiving the motor driving control signal through the system bus 2 from the CPU 3, the motor controller 12 outputs the motor driving signal to the motor drive unit 13, and drives the sheet feeding motor 214 and the head feeding motor 14. The timing controller 9 receives a position detection signal from the head position sensor 202 to detect the position of the printer head 30.

In order to simplify the description, the driving controller 204 is illustrated as driving only one nozzle 32a. However, it is actually provided with D/A converters 6, drive units 7, 10, quantification side electrostrictive element 309 and jet side electrostrictive elements 310, the number of each unit corresponding to the number of nozzles.

Figure 9:
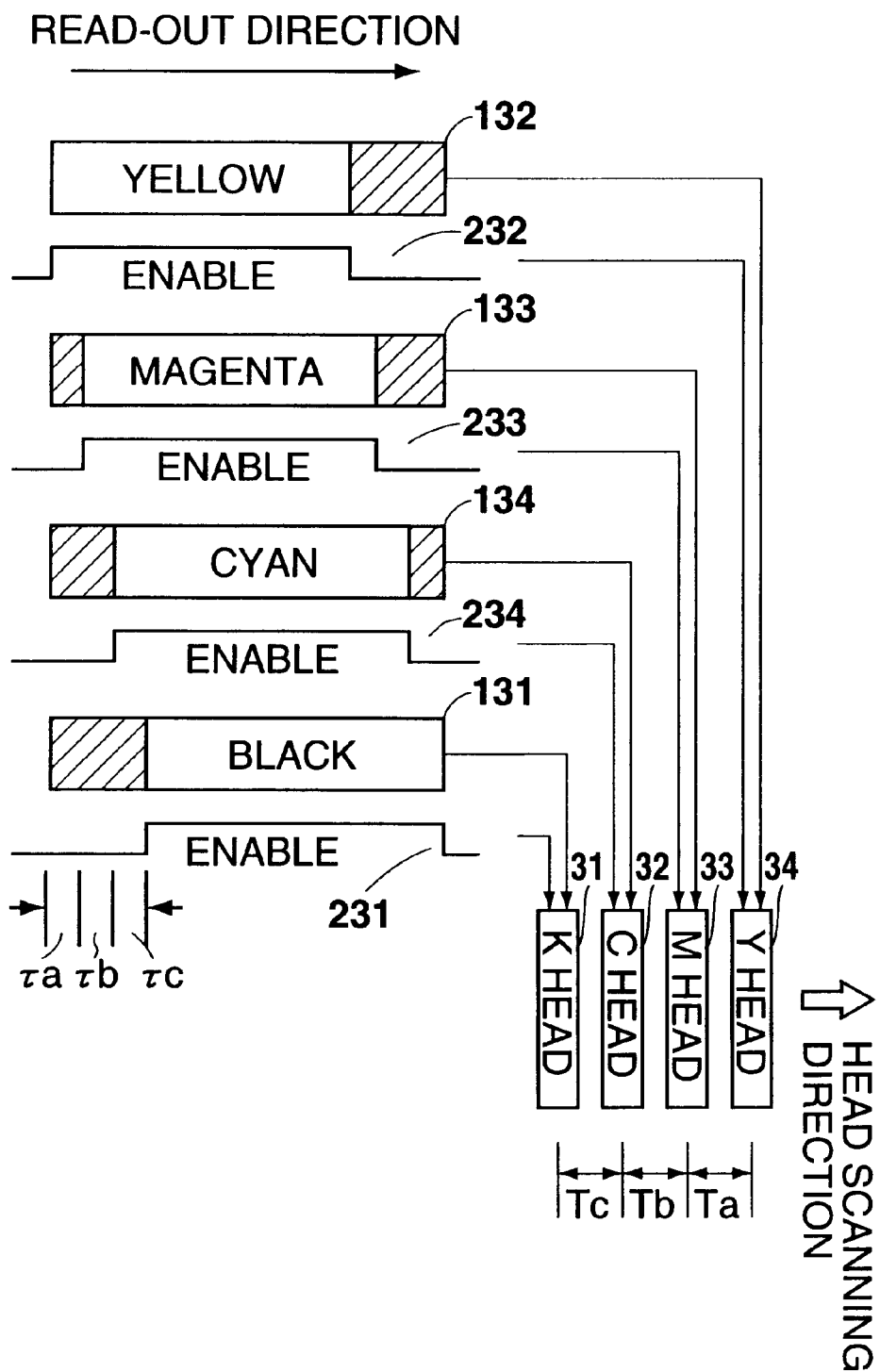
FIG. 9 is a diagram showing the print operation in the main scan direction of four color recording heads.

FIG. 9 is a diagram showing the print operation in the main scan direction of the four color recording heads. In the RAM 5 are allocated print information memories 131 to 134, each of which has an address corresponding to each of the recording heads 31 to 34 of K, C, M and Y and has a capacity of one scan. In each of the print information memories 131 to 134, print information (image information of cyan, magenta, yellow, black) is written at a position (τa, τb, τc) to which the address is shifted at the time interval corresponding to an arrangement interval (Ta, Tb, Tc) of the recording heads 31 to 34. Further, signal generators for generating main scan direction enable signals 231, 232, 233 and 234 are provided in connection with the print information memories 131 to 134, and control information showing a main scan direction enable signal section is written into these signal generators. The signal generations will be described later.

In synchronism with the access to the print information memories 131 to 134, each of the signal generators is driven, and the print information from the print information memories 131 to 134 is supplied to the recording heads 31 to 34. In addition, the main scan direction enable signals 231 to 234 from the respective signal generators are supplied to the recording heads 31 to 34. The recording heads 31 to 34 are driven only during a period when the main scan direction enable signals 231 to 234 are kept at high potential.

As described above, in synchronism with the scanning operation of the recording heads 31 to 34, each of the print information memories 131 to 134 is simultaneously accessed to read out the same address, whereby the print information for which the time interval corresponding to the arrangement interval of the recording heads 31 to 34 is shifted is output from each of the print information memories 131 to 134. In addition, the main scan direction enable signal 231 to 234, each representing each print section, is output from each of the signal generators.

The print information and the main scan direction enable signals 231 to 234 are supplied to the respective recording heads 31 to 34, whereby each of the recording heads 31 to 34 successively performs a multicolor printing operation at predetermined time intervals. Accordingly, unnecessary driving of the recording heads 31 to 34 in a section where no multicolor print is performed can be prevented.

Figure 10A:
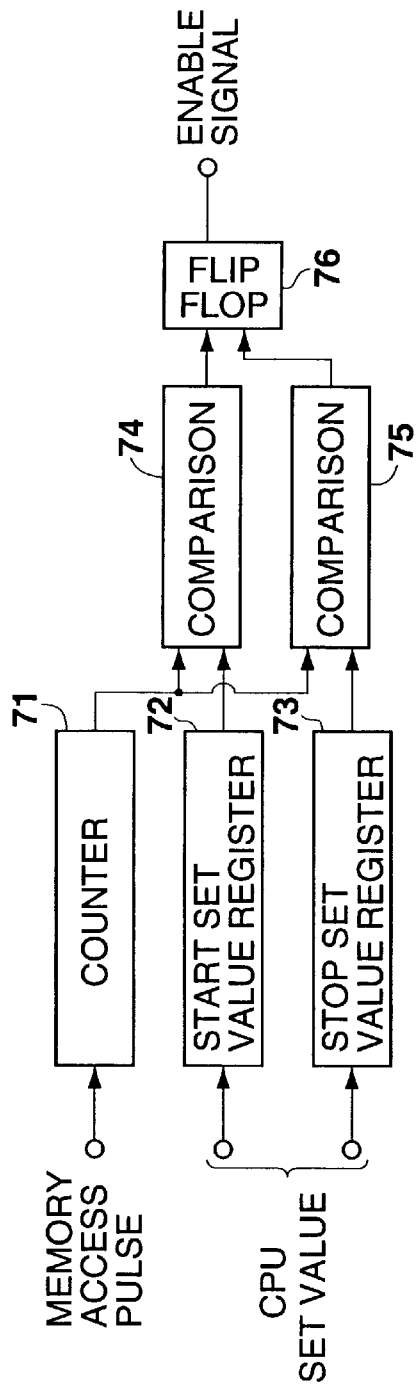
FIGS. 10A and 10B are block diagrams showing the construction of a signal generator.
Figure 10B:
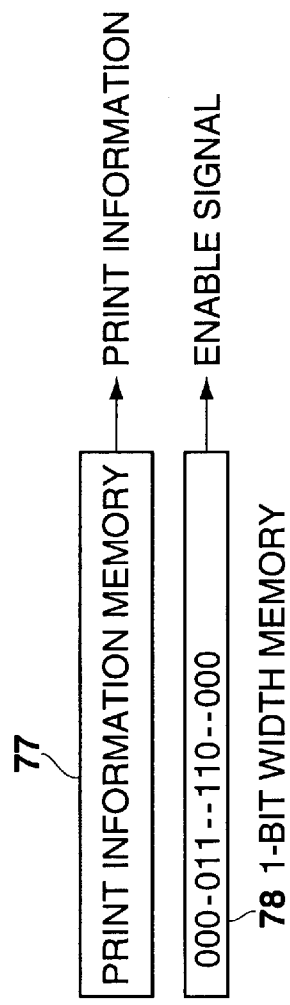

FIGS. 10A and 10B are block diagrams showing the construction of the signal generator. As the signal generators, as shown in FIG. 10A, the access pulse of the print information memories 131 to 134 is supplied to a counter 71, and the counter 71 counts every time this access is performed. The set values of a print start position and a print end position which are contained in the print control data from the host computer 20 are stored in registers 72 and 73. The values set in the registers 72, 73 and the count value of the counter 71 are compared in comparison circuits 74, 75, and a signal when these values are coincident with each other is supplied to the flip flop 6. Accordingly, from the flip flop 76 is output an enable signal which is kept at high potential while an address from the print start position until the print end position set in the host computer 20 is accessed in the print information memories 131 to 134.

As shown in FIG. 10B, a memory of 1-bit width which has the same address as the print information memories 131 to 134 is provided in the RAM 5, and the value of "1" is written in the address from the print start position to the print end position while the value of "0" is written in the other addresses.

Figure 11:
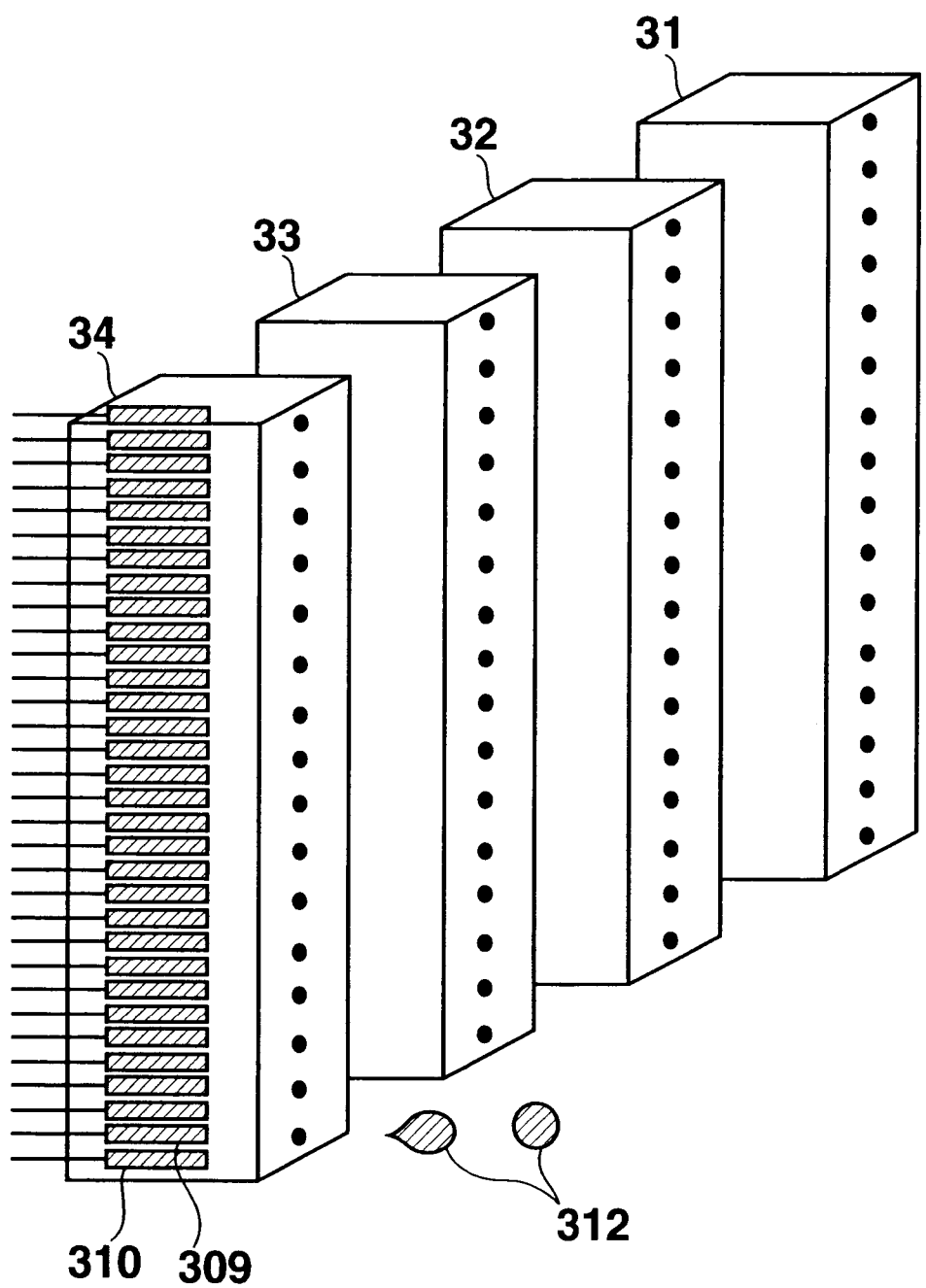
FIG. 11 is a diagram showing the construction of each recording head disposed in the printer head.

FIG. 11 is a diagram showing the construction of each of the recording heads which are arranged in the printer head. In the recording heads 31 to 34, 16 nozzles are provided to the housing of each recording head. Each nozzle is provided with electrostrictive elements 309 and 310 to generate jet droplets 312. When each recording head 31 to 34 is driven, the print information memories 131 to 134 corresponding to the respective recording heads 31 to 34 are provided.

Figure 12:
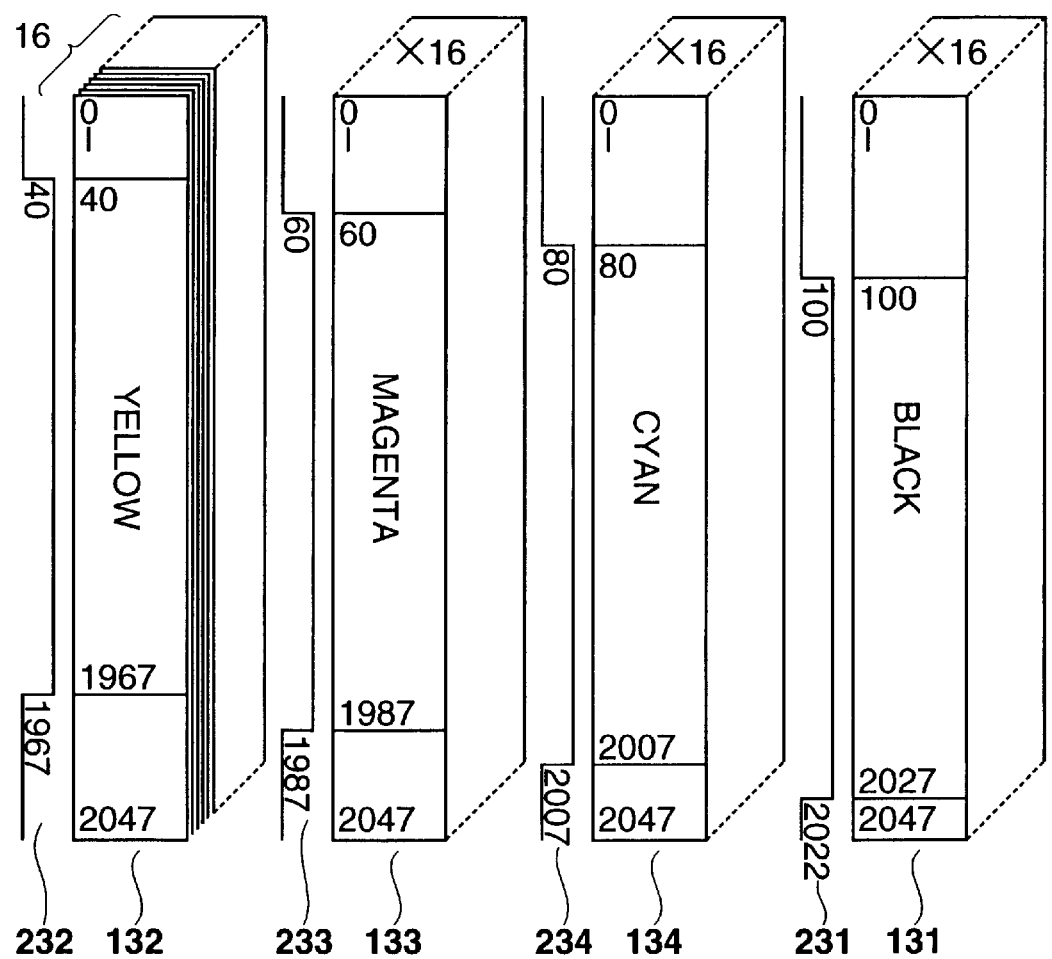
FIG. 12 is a diagram showing the construction of print information memories.

FIG. 12 is a diagram showing the construction of the print information memories 131 to 134. Each of the print information memories 131 to 134 has addresses of 0 to 2047. When the interval of the recording heads is set to the value corresponding to 20 pixels for example, the print information corresponding to the addresses 40 to 1967 for example is written in the print information memory 132. Likewise, the print information corresponding to the addresses 60 to 1987, the print information corresponding to the addresses 80 to 2007 and the print information corresponding to the addresses 100 to 2027 are written in the print information memory 133, the print information memory 134 and the print information memory 131 respectively. Further, sixteen memories are provided in parallel for the sixteen nozzles in each of the print information memories 131 to 134.

Further, each of the signal generators for generating the main scan direction enable signals 231 to 234 is provided for the sixteen memories constituting each of the print information memories 131 to 134. By providing the above-described signal generators, the load on the CPU 3 can be greatly reduced when compared with the case where blank data are written into all the sixteen memories constituting each of the print information memories 131 to 134 out of the print area.

Figure 13:
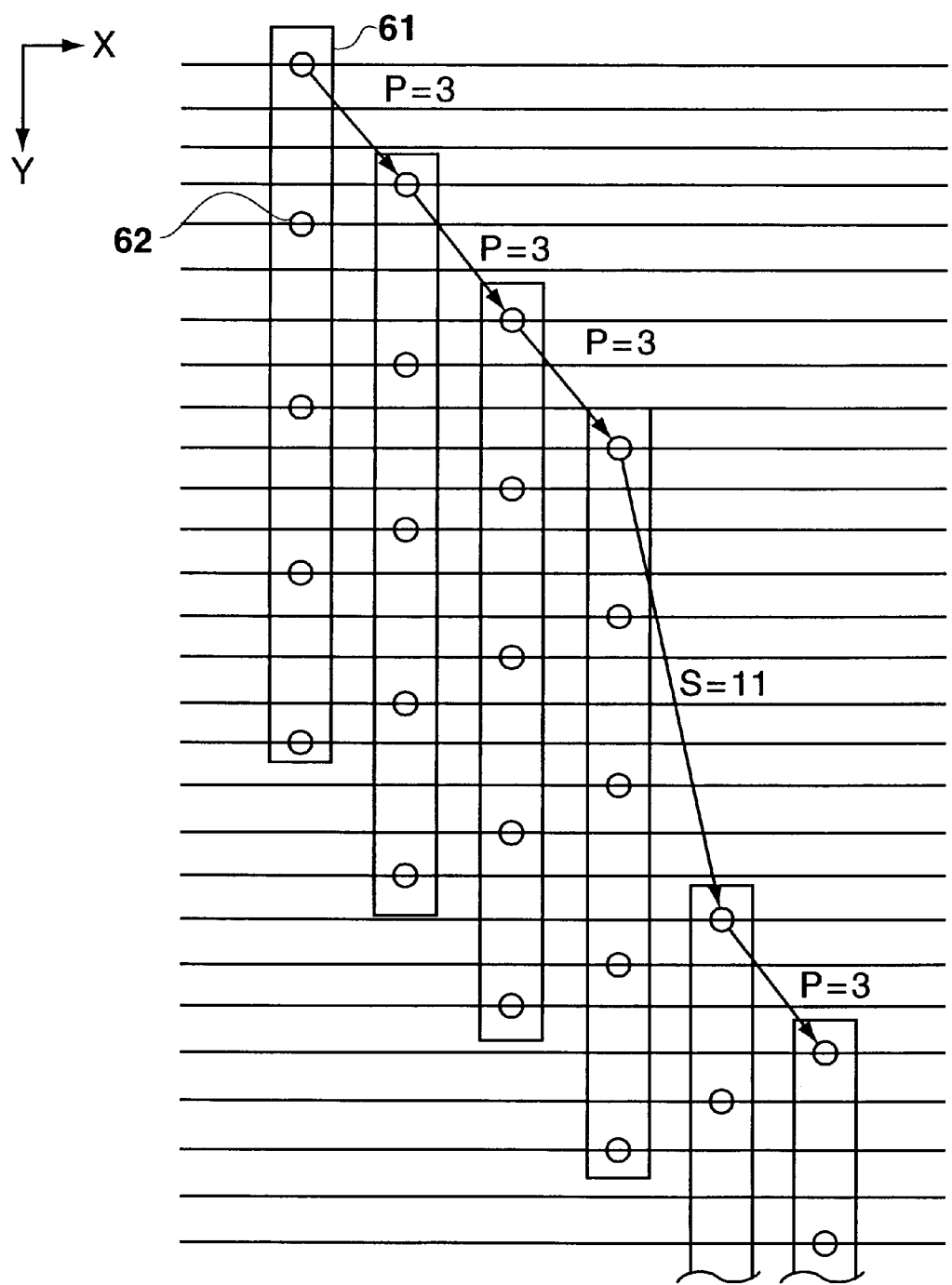
FIG. 13 is a diagram showing the print position in a single recording head.

The print operation of the printer head 30 in an interleave operation mode will be described. First, the case where a single recording head is used will be described. FIG. 13 is a diagram showing the print position in the single recording head. Five (N=5) nozzles 62 are arranged at an interval of 4 dots in the auxiliary scan direction, that is, the direction as indicated by an arrow Y in FIG. 13. The recording head 61 is fed in the auxiliary scan direction by 3 dots (P=3), and it is scanned at three times (K−1=3) in the main scan direction. Further, the recording head 61 is fed in the auxiliary scan direction by 11 dots (S=11), and scanned once in the main scan direction, that is, the direction as indicated by an arrow X in FIG. 13. For clarity, the print position is illustrated in FIG. 13 as being displaced in the main scan direction every scanning operation.

In this interleave operation, the ratio of P and K. P/K=3/4 is equal to an irreducible fraction. Further, N·K/(K−1)=20/3 and P<N·K/(K−1) are satisfied. Further, S=K·N−P·(K−1)=11 is satisfied. Accordingly, in the case of the interleave operation based on the single recording head 61, all the conditions as described above are satisfied.

Next, a case where the printer head 65 has recording heads 66 to 69 of four colors of black (K), cyan (C), magenta (M) and yellow (Y) will be described.

Figure 14:
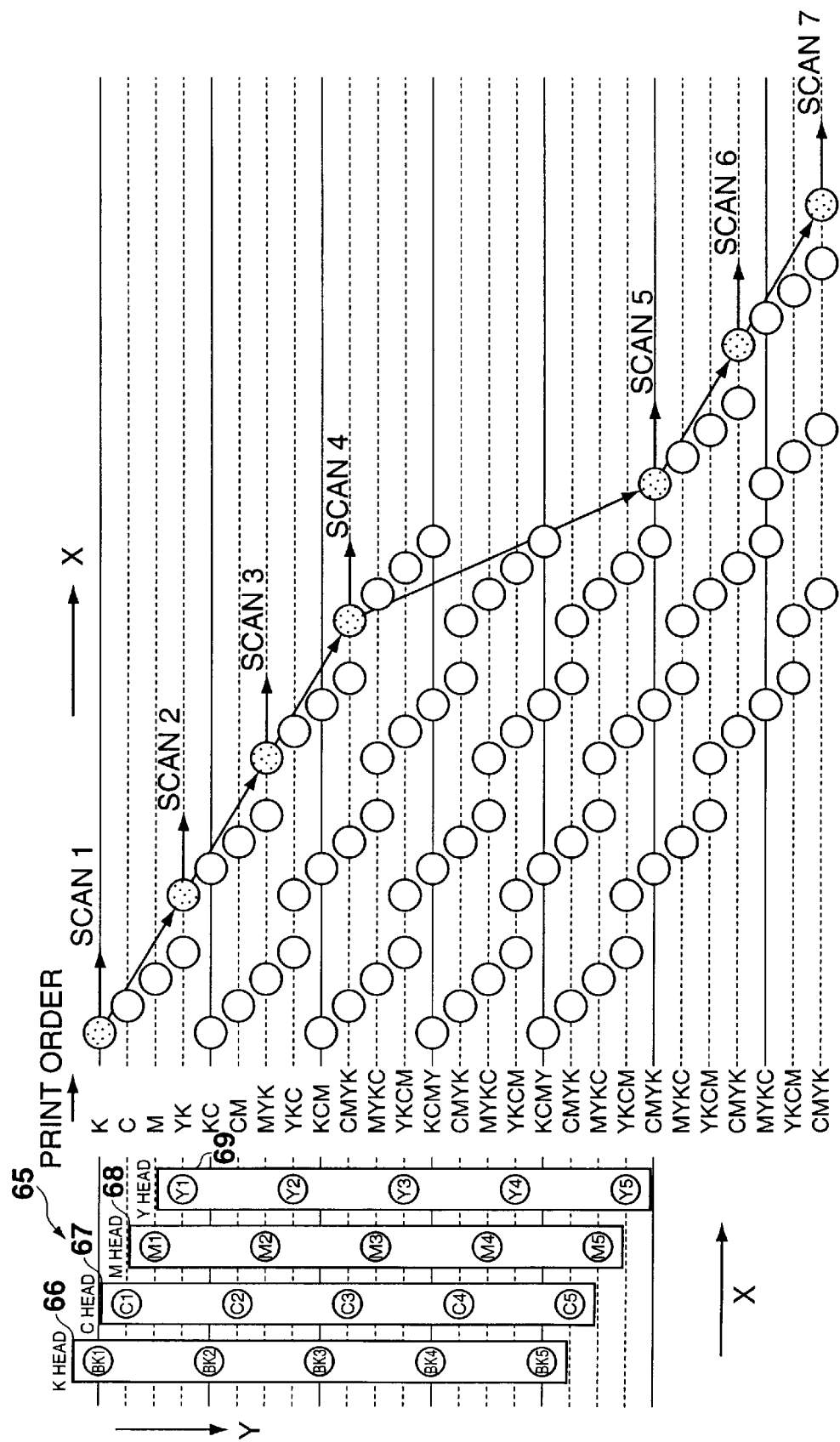
FIG. 14 is a diagram showing the print position in four color recording heads.

FIG. 14 is a diagram showing the print position in the recording heads of four colors. Five nozzles (N=5) are arranged in Y (auxiliary scanning) direction on each of the four color recording heads 66 to 69 (M=4) of K, C, M, Y so as to be spaced at an interval of 4 dots (K=4) and so that the displacement between the recording heads is equal to 1 (L=1) dot. The printer head 65 is fed in the auxiliary scan direction by 3 dots (P=3), and scanned in the main scan direction, that is, the direction as indicated by an arrow X in FIG. 14 at three times (K−1=3), and further it is fed in the auxiliary scan direction, that is, the direction as indicated by an arrow Y in FIG. 14 by 11 dots (S=11) and scanned once in the main scan direction.

In this interleave operation, the ratio of P and K, P/K=3/4 is equal to an irreducible fraction, N·K/(K−1)=20/3 and P<N·K/(K−1) are satisfied, and S=K·N−P·(K−1)=11 is satisfied. In addition, M≦K and L·M≦K are satisfied, and the respective recording heads are displaced from one another in an interval of L dots. Accordingly, in the case of the interleave operation based on the head 65, all the conditions as described above are satisfied.

Figure 15:
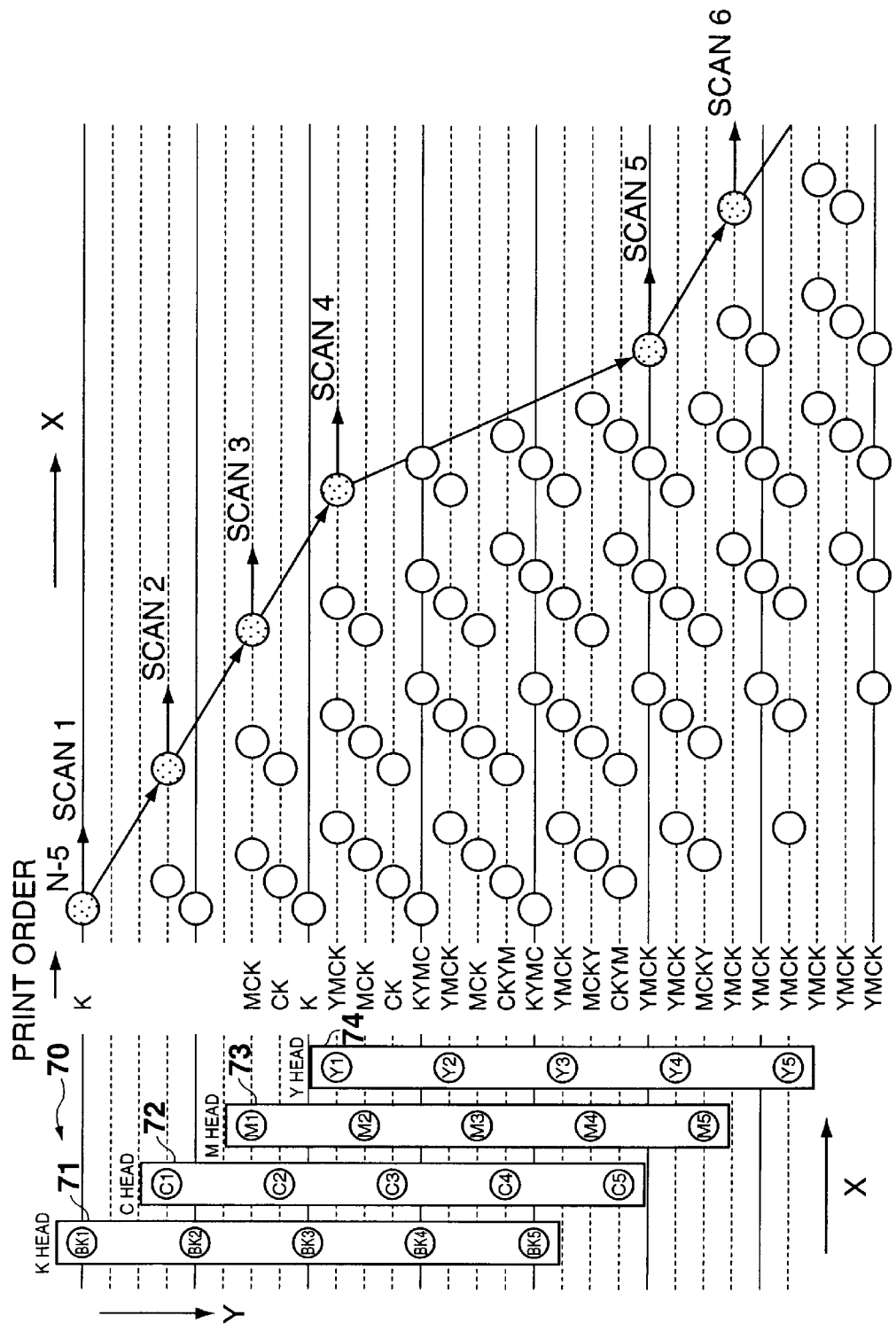
FIG. 15 is a diagram showing the print position in the four color recording heads.

Next, a printer head 70 in which the displacement of the four color recording heads 71 to 74 in the auxiliary scan direction, that is, the direction as indicated by an arrow Y in FIG. 15, is larger than the printer head as described with reference to FIG. 14 will be described. FIG. 15 is a diagram showing the print position in the four color recording heads. Five nozzles (N=5) are arranged in the Y (auxiliary scanning) direction on each of the four color recording heads 71 to 74 (M=4) of K, C, M and Y so as to be spaced at an interval of 4 dots (K=4) and so that the displacement between the recording heads is equal to 3 (L=3) dots. The printer head 70 is fed in the auxiliary scan direction by 3 dots (P=3), and scanned in the main scan direction, that is, the direction as indicated by the arrow X in FIG. 15, at three times (K−1=3), and further it is fed in the auxiliary direction by 11 dots (S=11) and scanned once in the main scan direction.

In this interleave operation, the ratio of P and K, P/K=3/4 is equal to an irreducible fraction. Further, N·K/(K−1)=20/3 and P<N·K/(K−1) are satisfied. Still further, S=K·N−P·(K−1)=11 is satisfied. In addition, since M≦K, L·M=12 and L·M>K, the respective recording heads are displaced from one another by L dots so that L/K=3/4 is equal to an irreducible fraction. Accordingly, in the case of the interleave operation based on the printer head 70, all the conditions as described above are satisfied.

In this print operation the print order is matched with YMCK on most of scanning lines, and there is little factor which causes deterioration of an image.

Figure 16:
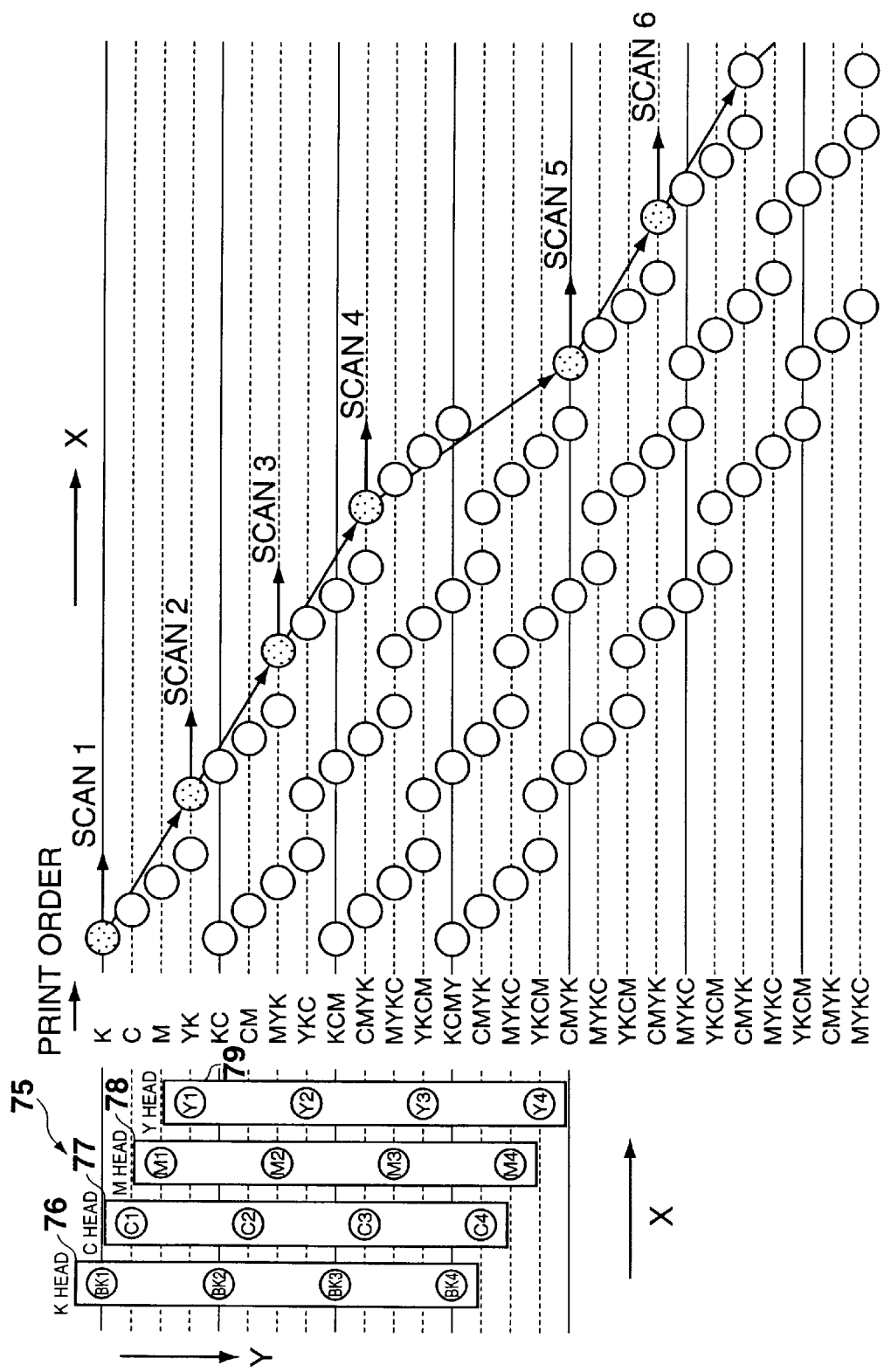
FIG. 16 is a diagram showing the print position in the four color recording heads.

Likewise, the case where the printer head 75 has four color recording heads 76 to 79 of black (K), cyan (C), magenta (M) and yellow (Y) will be described. FIG. 16 is a diagram showing the print position in the four color recording heads. Four nozzles (N=4) are arranged in the auxiliary scan direction, that is, the direction as indicated by an arrow Y in FIG. 16, on each of the four color recording heads 76 to 79 (M=4) of K, C, M, Y so as to be spaced at an interval of 4 dots (K=4) and so that the displacement between the recording heads is equal to 1 (L=1) dot. The printer head 75 is fed in the auxiliary scan direction by 3 dots (P=3), and scanned in the main scan direction, that is, the direction as indicated by an arrow X in FIG. 16, at three times (K−1=3), and further it is fed in the auxiliary direction by 7 dots (S=7) and scanned once in the main scan direction.

In this interleave operation, the ratio of P and K, P/K=3/4 is equal to an irreducible fraction. Further, N·K/(K−1)=20/3 and P<N·K/(K−1) are satisfied. Still further, S=K·N−P·(K−1)=11 is satisfied. In addition, since M≦K, L·M=4 and L·M≦K. Accordingly, in the case of the interleave operation based on the printer head 75, all the conditions as described above are satisfied.

According to the print order shown in FIGS. 14 to 16, the host computer 20 performs the above-described print order color correction processing to correct a deviation of halftone.

As described above, in this embodiment, the color correction processing which is optimum to the jet order of each color ink (print order) in each scanning line forming an image on a recording sheet is prepared in advance, and when the jet order (print order) of the color ink is varied every scanning line, the color correction processing suitable for the print order is selected and performed every scanning line, whereby the difference in the reproduced image of each scanning line can be suppressed to the extent that it is visually unrecognizable.

In the above embodiment, the description on the carrier jet printer is described. However, the present invention may be applied to an ink jet type printer for controlling only the jet operation of ink, and the construction of the print drive circuit can be simplified. In this case, in place of the multivalued dither processor, binary dither processing is performed, and after the binary processing, 1-bit/1-pixel·E1-color data are obtained. Accordingly, the color correction processing is required to be performed at a pre-stage of the binary dither processing. For example, the color correction processing may be also in combination in the color correction gradation correction unit 23 shown in FIG. 2.

Further, in the above-described embodiment, the present invention is applied to an ink jet type printer, represented by a piezoelectric element (electrostrictive element), in which ink is jetted by pressure variation due to mechanical displacement. However, the present invention may be applied to a bubble jet printer in which ink is jetted by bubbles generated by heating of heating elements. This can be implemented by merely changing the construction of a driving unit for driving each nozzle, and the same effect can be obtained.

Still further, in the above-described embodiment, the respective color recording heads arranged in the printer head are stepwise arranged. However, the present invention is not limited to this arrangement. For example, when the four color recording heads are set as first, second, third and fourth heads from the left side of the main scan direction, there may be used such an arrangement that the first and second heads and the third and fourth heads are not displaced in the auxiliary scan direction while the third and fourth heads are displaced to the lower side of the first and second heads. Further, there may be used such an arrangement that the second head is displaced to the upper side of the first head, the third head is displaced to the lower side of the second head, and the fourth head is displaced to the upper side of the third head. Many variations of the invention will ower to those skill in the art.

What is claimed is:

1. A printer apparatus comprising:

a printer head which scans relative to a recording medium in a main scan direction and an auxiliary scan direction perpendicular to the main scan direction, said printer head having M recording heads, each recording head including N color recording elements, said recording heads being arranged in the main scan direction while being displaced from one another at an interval corresponding to L dots in an auxiliary scan direction, such that, during an interleave operation in every scanning operation, said M recording heads move in the auxiliary scan direction at an interval of P dots (K−1) times and then move in the auxiliary scan direction at an interval of S dots once, wherein P/K is an irreducible fraction, P being an integer smaller than N·K/(K−1), K being a resolution element interval and S being equal to K·N−P(K−1), and wherein when M>1, for M≦K and L·M≦K, L is a positive integer and said recording heads are arranged to be displaced from one another in the auxiliary scan direction at an interval of L dots; and a color correction processor for supplying print data to said print head, said color correction processor performing color correction processing, based on the print order of said color recording elements, on image signals to be recorded on a recording medium.

2. The printer apparatus according to claim 1, wherein said color correction processor calculates corrected complementary color signals Co, Mo, Yo according to the following equations when masking coefficients between complementary color signals C, M, Y based image signals of R, G, B and corrected complementary signals Co, Mo, Yo obtained by correcting the deviation of the respective complementary color signals C, M, Y and respective optical characteristics of the complementary color ink, are represented by cy, cm, my, mc, ym, yc, $Yo=Y+ym·M+yc·C$ $Mo=my·Y+M+mc·C$ $Co=cy·Y+cm·M+C.$ 3. The printer apparatus according to claim 1, wherein said recording heads are arranged in a step-like arrangement while being displaced from one another at the interval corresponding to L dots, and said print head moves in the auxiliary scan direction during the interleave operation.

4. A printer apparatus comprising:

a printer head which scans relative to a recording medium in a main scan direction and an auxiliary scan direction perpendicular to the main scan direction, said printer head having M recording heads, each recording head including N color recording elements, said recording heads being arranged in the main scan direction while being displaced from one another at an interval corresponding to L dots in an auxiliary scan direction, such that, during an interleave operation in every scanning operation, said M recording heads move in the auxiliary scan direction at an interval of P dots (K−1) times and then move in the auxiliary scan direction at an interval of S dots once, wherein P/K is an irreducible fraction, P being an integer smaller than N·K/(K−1), K being a resolution element interval and S being equal to K·N−P(K−1), and wherein when M≦K and L·M>K, L is equal to a positive integer and said recording heads are arranged to be displaced from one another at an interval of L dots so that L/N is equal to an irreducible fraction; and a color correction processor for supplying print data to said print head, said color correction processor performing color correction processing, based on the print order of said color recording elements, on image signals to be recorded on a recording medium.

5. The printer apparatus according to claim 4, wherein said color correction processor calculates corrected complementary color signals Co, Mo and Yo according to the following equations when masking coefficients between complementary color signals C, M, Y based image signals of R, G and B and corrected complementary signals Co, Mo and Yo obtained by correcting the deviation of the respective complementary color signals C, M and Y and respective optical characteristics of the complementary color ink, are represented by cy, cm, my, mc, ym, yc:

$Yo=Y+ym·M+yc·C$ $Mo=my·Y+M+mc·C$ $Co=cy·Y+cm·M+C.$

6. The printer apparatus according to claim 4, wherein said recording heads are arranged in a step-like arrangement while being displaced from one another at the interval corresponding to L dots, and said print head moves in the auxiliary scan direction during the interleave operation.

* * * * *